United States Patent [19]

Slack et al.

[11] 4,239,502
[45] Dec. 16, 1980

[54] DIAMOND AND CUBIC BORON NITRIDE GRINDING WHEELS WITH IMPROVED SILVER ALLOY BONDS

[75] Inventors: Glen A. Slack, Scotia; Warren S. Knapp, Amersterdam, both of N.Y.

[73] Assignee: General Electric Company, Worthington, Ohio

[21] Appl. No.: 961,722

[22] Filed: Nov. 17, 1978

Related U.S. Application Data

[63] Continuation of Ser. No. 773,095, Feb. 28, 1977, abandoned, and a continuation-in-part of Ser. No. 645,786, Dec. 31, 1975, abandoned.

[51] Int. Cl.³ .............................. E21B 9/36; B23K 1/20
[52] U.S. Cl. ......................................... 51/295; 51/309; 357/67; 357/81
[58] Field of Search .................... 51/295, 309; 357/81, 357/15, 28, 29, 30, 55, 67, 71

[56] References Cited

U.S. PATENT DOCUMENTS

| | | | |
|---|---|---|---|
| 2,141,113 | 12/1938 | Peterson | 51/295 |
| 2,195,307 | 5/1940 | Hensel et al. | 51/295 |
| 2,367,404 | 1/1945 | Kott | 51/309 |
| 2,411,867 | 12/1946 | Brenner | 51/309 |
| 2,418,529 | 4/1947 | Stern | 51/295 |
| 2,562,587 | 7/1951 | Swearingen | 51/295 |
| 2,705,194 | 3/1955 | St. Clair | 51/309 |
| 2,728,651 | 12/1955 | Hall | 51/309 |
| 2,906,612 | 9/1959 | Anthony et al. | 51/295 |
| 3,178,273 | 4/1965 | Libal | 51/309 |
| 3,465,416 | 9/1969 | Welborn | 51/309 |
| 3,594,141 | 7/1971 | Houston et al. | 51/309 |

FOREIGN PATENT DOCUMENTS 745025A 8/1973 South Africa ............................ 51/309

OTHER PUBLICATIONS

Kirk-Othmer Encycl. of Chem. Tech., 2nd Ed., 1969, vol. 18, pp. 546 and 547.

*Primary Examiner*—Donald J. Arnold
*Attorney, Agent, or Firm*—Douglas B. Little; William S. Feiler; Dennis A. Dearing

[57] ABSTRACT

A silver-manganese-zirconium brazing alloy with a high percentage of silver at least exceeding 80 percent is used in a process for fabricating strong, high thermal conductivity bonds between diamond or cubic boron nitride (CBN) and a molybdenum or tungsten support member. Typical diamond or CBN-alloy-metal products with the improved alloy bond are semiconductor device heat sinks, grinding wheels and tools.

2 Claims, 4 Drawing Figures

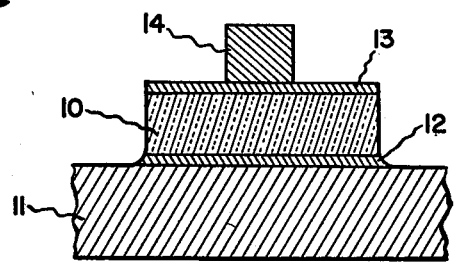
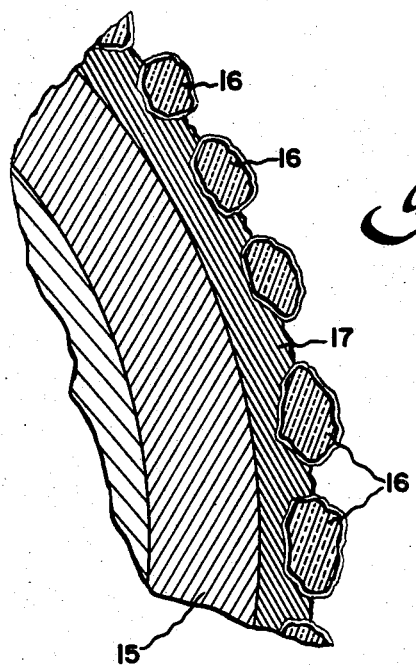
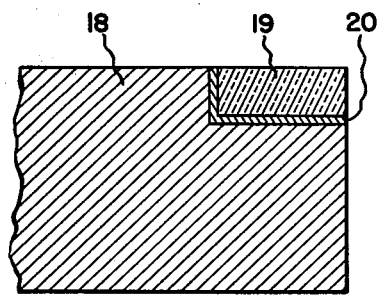
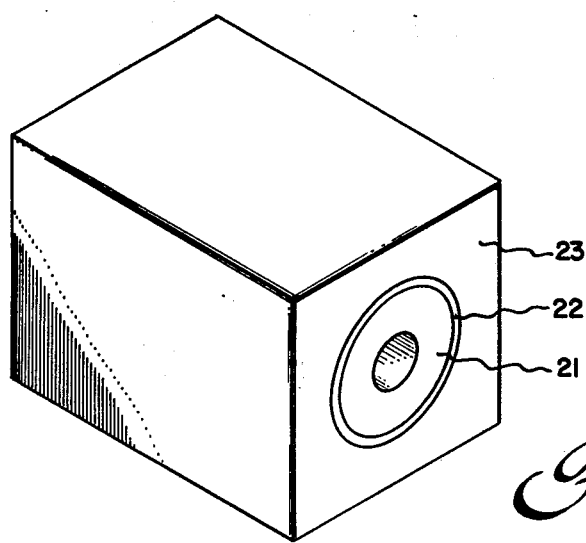
Fig. 1
Fig. 2
Fig. 3
Fig. 4

DIAMOND AND CUBIC BORON NITRIDE GRINDING WHEELS WITH IMPROVED SILVER ALLOY BONDS

This is a continuation of application Ser. No. 773,095 filed Feb. 28, 1977, a continuation-in-part of application Ser. No. 645,786, filed Dec. 31, 1975 both now abandoned.

BACKGROUND OF THE INVENTION

This invention relates to bonding diamond or cubic boron nitride (CBN) to metal substrates, and also to improved products such as semiconductor device heat sinks and industrial grinding and cutting tools in which diamond or CBN is bonded to a metal supporting structure.

Because diamond is the non-metal with the highest thermal conductivity over a usable range of temperatures, diamond has been used as a substrate to heat sink microwave and other semiconductor power devices. CBN also has a high thermal conductivity approximating that of diamond and could also be used in such applications. Diamond and CBN particles are also employed as grinding wheel abrading elements and are subject to high temperatures under working conditions. Similarly, bonded polycrystalline compacts of diamond or CBN are used as cutting tool blanks and inserts which are exposed to high temperatures in use. Such compacts are disclosed e.g., in U.S. Pat. Nos. 3,136,615, 3,233,988, 3,743,489, 3,745,623 and 3,767,371. In order to more successfully use diamond and CBN as heat sinks or to extract the heat from diamond or CBN abrading or cutting elements, it is desirable to have a strong, high thermal conductivity bond between the diamond or CBN and a metal substrate or supporting structure.

Although silver is known to have the highest thermal conductivity of the metals, a difficulty with pure silver used as a brazing material is that it does not adhere well to diamond. The more commonly used "silver solders" or "silver brazing alloys" actually are alloy compositions with considerable less than 100 percent silver which do not have the desired combination of properties. The prior art relating to bonding diamond to metal bases also refers to depositing very thin layers of platinum or cobalt on diamond as preparation for further steps, and broadly refers to silver coatings, but the deficiency of all of these is that either the thermal conductivity or the tensile strength of the bond to diamond is low.

SUMMARY OF THE INVENTION

In accordance with the invention, a silver-manganese-zirconium brazing alloy used in an oxygen-free and nitrogen-free environment has been found to make strong, high thermal conductivity bonds between diamond or CBN and a molybdenum or tungsten support member. In the silver-base alloy, the active metal additives manganese and zirconium form carbides with diamond and form borides and nitrides with CBN to obtain a chemical attachment at the diamond or CBN alloy interface. Molybdenum and tungsten both match the thermal expansion coefficient of diamond and CBN so that there is no cracking as the bond cools to room temperature, although other metals such as chromium, iridium, niobium, platinum, rhenium and tantalum with similar low expansion coefficients can also be used. Manganese is added in the range of 0.1 to 15 atom percent, and zirconium in the range of 0.1 to 5 atom percent, although a high percentage of silver is preferred to produce a high termal conductivity bond. In one process for fabricating such bonds, a diamond or CBN body is dipped into liquid silver-base alloy heated above its melting temperature (about 1000° C.) and kept under an oxygen-free and nitrogen-free gaseous atmosphere, and removed and cooled to room temperature. The metal support member and coated diamond or CBN body are then clamped together and redipped in the silver-base alloy and subsequently cooled. Excessive solidified alloy is removed from surface areas of the bonded assembly as required.

Typical improved diamond and CBN products with a strong, high thermal conductivity bond between the diamond or CBN and a molybdenum, tungsten or other support member include a semiconductor device heat sink and a diamond grinding wheel. Other industrial products, for example, are a compact cutting tool for machining operations and a diamond compact wire drawing die. For many products, in view of its lower cost, molybdenum is preferred as the metal support member. The silver-base alloy bonding layer according to one composition that gives good results, consists essentially of about 94 atom percent silver, 3 atom percent manganese, and 3 atom percent zirconium.

BRIEF DESCRIPTION OF THE DRAWINGS

FIG. 1 is a diagrammatic cross-sectional view of an improved diamond or CBN heat sink for a semiconductor device with a silver-zircondium-manganese alloy bond and molybdenum support member as herein taught;

FIG. 2 is a fragmentary diagrammatic cross section at the perimeter of a diamond or CBN grinding wheel;

FIG. 3 shows a cross section through the end portion of a cutting insert or tool holder with an alloy bonded diamond or CBN cutting element; and FIG. 4 is a perspective view of a diamond or CBN wire drawing die having an alloy bond to a molybdenum or tungsten supporting structure.

DESCRIPTION OF THE PREFERRED EMBODIMENTS

Mechanically strong, high thermal conductivity bonds between diamond or CBN and a metal substrate or support member are achieved using a silver-manganese-zirconium brazing alloy with a high percent of silver at least exceeding 80 percent. The metal substrate or support member has a thermal expansion coefficient closely matching that of diamond and CBN so that no cracks occur in the alloy bond upon cooling to room temperature, and in particular is made preferably of molybdenum or tungsten, or of other metals such as chromium, iridium, niobium, platinum, rhenium, and tantalum. In the silver-base alloy, manganese and zirconium are active metal additives that react with diamond to respectively form manganese carbide and zirconium carbide and thereby obtain a chemical attachment at the diamond surface. Similarly, manganese reacts with CBN to form manganese boride and nitride, and zirconium reacts with CBN to form zirconium boride and nitride. In addition to forming a carbide with diamond, manganese is a solvent for carbon and functions as a surface cleaning agent. For good results, manganese is added in the range of 0.1 to 15 atom percent, and zirconium in the range of 0.1 to 5 atom percent, the balance being silver. The presence of increasing amounts of manganese and zirconium in the silver-base brazing or soldering alloyl results in an increasingly lower thermal conductivity, and desirably only enough manganese and zirconium are used to achieve chemical attachment at the diamond or CBN alloy interface. For example, one suitable composition consists essentially in atom percent of about 94 percent silver, 3 percent manganese, and 3 percent zirconium. This particular alloy composition has a melting temperature of about 955° C.

In order to avoid oxidation or nitradation of the active manganese and zirconium components, bonding together of the diamond or CBN body and metal support member at a temperature above the melting temperature of the silver-base brazing alloy takes place in an oxygen-free and nitrogen-free environment or atmosphere. By way of illustration, the suitable process for fabricating high tensile strength and high thermal conductivity alloy bonds will be described in detail, although other processes will be evident to those skilled in the art. In practicing the bonding process, a body selected from the group consisting of natural diamond crystal(s), a synthetic diamond crystal(s), CBN crystal(s), a diamond compact, and a CBN compact can be used. (A compact is defined as an aggregate of abrasive crystals bonded together either (1) in a self-bonded relationship, (2) by means of a bonding medium disposed between the crystals or (3) by means of some combination of (1) and (2).)

In one example of the practice of the invention, the surface of a natural diamond crystal was first cleaned with a molten eutectic etch of lithium nitrate, sodium nitrate, and potassium nitrate at 650° C. The diamond was then coated with the liquid silver-base alloy, held in an alumina crucible at 1000° C., by dipping it beneath the liquid surface for one minute. The previously mentioned 94 atom percent silver, 3 atom percent manganese, and 3 atom percent zirconium alloy was used, and the molten alloy was kept under a blanketing atmosphere of ultra-pure helium to avoid oxidation or nitration of the active metal additives. The alloy-coated diamond was then removed and cooled to room temperature. The thickness of the alloy coating was typically between one and two mils. The coated diamond was then clamped between two opposite, flat-faced molybdenum rods, and then dipped again into the molten alloy. Upon removal, no cracks occurred in the alloy bond upon cooling to room temperature.

Measurements of the electrical resistivity of the alloy bonding layer or brazed alloy joint at room temperature give $P-7.05\times10^{-6}$ ohm cm, and indicate a thermal conductivity of $K-1.0$ (watt/cm°K.) at room temperature. This is a high thermal conductivity, substantially higher than obtained by use of other alloys. A diamond-alloy-molybdenum bond with an alloy thickness of about $4\times10^{-3}$ cm and a cross-sectional area of $2\times5\times10^{-2}$ broke at $1.7\times10^9$ dyne/cm$^2$ (25,000 lbs./in.$^2$). A second similar bond had similar properties. Pieces of diamond were actually pulled out of the diamond surface when the alloy bond broke. The tensile strength of the diamond-alloy-molybdenum bond is about six times greater than an identically fabricated diamond-alloy-platinum bond using the same silver-base brazing alloy composition, which by way of comparison broke at a tensile strength slightly above 4000 lbs/in.$^2$. The tensile strength of a diamond-alloy-tungsten bond is also high and comparable to that of the bond to a molybdenum support member since tungsten has a thermal expansion coefficient even closer to that of diamond. For many applications, however, molybdenum is favored in view of its lower cost.

To further illustrate the practice of this invention and to compare its utility with respect to another braze alloy, brazing experiments were conducted with a preferred alloy composition of this invention (in atom percent: 94% Ag, 3% Mn and 3% Zr) and a silver-zirconium alloy (in atom percent: 97% Ag and 3% Zr) as identified in TABLE I.

TABLE I

| Sample No. | Substrate | Alloy |
|---|---|---|
| 1 | CBN compact | Ag/Zr/Mn |
| 2 | CBN compact | Ag/Zr |
| 3 | Direct conversion CBN compact | Ag/Zr/Mn |
| 4 | Direct conversion CBN compact | Ag/Zr |
| 5 | Diamond compact | Ag/Zr/Mn |
| 6 | CBN crystals | Ag/Zr/Mn |
| 7 | CBN crystals | Ag/Zr |
| 8 | Diamond crystals | Az/Zr/Mn |

The CBN compacts were comprised in weight percent of about 80% CBN and about 20% Al alloy and were made in accordance with the teaching of U.S. Pat. No. 3,743,489.

The direct conversion CBN compacts were comprised in weight percent of 99+% CBN with minor impurities and were made in accordance with the teaching of copending U.S. application Ser. No. 736,988 filed Oct. 29, 1976, now abandoned, and assigned to the assignee of the invention herein.

The diamond compact was comprised in weight percent of approximately 82% diamond and 18% Co alloy and was made in accordance with the teaching of U.S. Pat. No. 3,745,623.

To test the compact samples, a piece of the brazing alloy was set on the compact surface. With regard to the crystal samples, the alloy and crystals were placed in tantalum cups. All samples were placed on an aluminum oxide support in the hot zone of an electrically heated tube furnace. The furnace was flushed with dry argon gas and the samples heated under flowing argon to 1100°-1150° C. Heating time was about one hour and the temperature was maintained above 1100° C. for 2-3 minutes. The samples were cooled under flowing argon to about 500° C.

Both the CBN and diamond crystals showed much better coverage with the Ag/Zr/Mn alloy than the CBN crystals with the Ag/Zr alloy. Because the Ag/Zr/Mn alloy also wetted and flowed better over the tantalum cup than the Az/Zr alloy, the results could have been influenced by the different flow properties of the alloys on the tantalum container.

With the compact samples, both types of braze formed, melted and resolidified as beads on the compact surfaces. Attempts were made to dislodge the beads by hand pressure with a carbide pencil. Only the Ag/Zr bead on the direct conversion CBN compact could be "popped off" the compact surface.

Microscopic observations were also made of the contact angle "γ" between the braze beads and the compact surfaces. The contact angle is defined as the interior angle between the bonded surface and the tangent to the braze head at the point of contact with the bonded surface.

A contact angle of 0° would correspond to complete wetting and 180° to no wetting between the solid (compact) and liquid (braze) materials, i.e. a smaller contact angle indicates better wetting and bonding between the two materials.

In TABLE II, the contact angles for the various braze/compact combinations are classified according to contact angles of greater or less than 9° C. as determined from microscopic examination. The angles in parentheses in the table are visual estimates of the contact angles. Also summarized in the table are the results of the disloding attempts.

TABLE II

| Samples No. from TABLE I | Contact Angle | Bead Removed by Hand Pressure |
|---|---|---|
| 1 | <90 (60–75) | No |
| 2 | ~90 (90) | No |
| 3 | <90 (60–75) | No |
| 4 | >90 (>135) | Yes |
| 5 | <90 (60–75) | No |

From the above results, it is concluded that under the experimental conditions used in the brazing experiments (dry argon atmosphere):

1. The Ag/Zr/Mn alloy wets and bonds well to CBN (a direct conversion CBN compact is single phase CBN no alloy binder phase).

2. The Ag/Ag alloy does not wet or bond well to CBN.

3. Both the Ag/Zr/Mn and Ag/Zr alloys wet and bond alloy to CBN compacts, which contain an alloy phase. However, the Ag/Zr/Mn alloy forms a better bond than the Ag/Zr alloy (from observed contact angles).

4. The Ag/Zr/Mn alloy wets and bonds well to diamond compacts.

In the drawing are shown several improved industrial diamond or CBN products incorporating the strong, high thermal conductivity bond between a diamond or CBN body or a plurality of diamond or CBN bodies and a metal support member or substrate. FIG. 1 shows diagrammatically a diamond or CBN heat sink assembly for a variety of power semiconductor devices including, by way of example, microwave devices and semiconductor laser devices. A natural or synthetic diamond or CBN substrate 10 has its lower flat major surface bonded to a flat molybdenum substrate 11 with a silver-base alloy bonding layer or brazed joint 12 as herein described. In view of the high thermal conductivity of the silver-base alloy, the upper major face of diamond substrate 10 is also desirably provided with a similar silver-base alloy bonding layer 13 for bonding a body of semiconductor material 14 to the diamond substrate. The semiconductor body 14 can be a semiconductor substrate or the device itself. In view of the high thermal conductivity of the substrate 10 and both bonding layers or brazed joints, heat generated by the semiconductor device is efficiently conducted to the larger area molybdenum substrate 11 and dissipated. The diamond or CBN metal heat sink can be fabricated using the process previously described in which the diamond or CBN substrate is first dipped into liquid silver-base alloy, removed and cooled to room temperature, clamped to the metal substrate, and redipped into the liquid silver-base alloy. After cooling to room temperature, unwanted areas of silver-base alloy coating, such as at the sides of the diamond or CBN substrate, can be removed using an appropriate etchant. Another suitable process for fabricating the diamond or CBN alloy-metal bond at or above the melting temperature of the brazing alloy in an oxygen-free and nitrogen-free atmosphere involves the use of an ultra-high vacuum system such as a high temperature chamber or vacuum chamber. The surfaces to be joined can be coated by using a sputtering technique and then clamping together the coated diamond or CBN and coated metal support member to make the brazed joint. Employing the high vacuum system, the silver-base alloy alternatively can be used as a regular brazing alloy assuming it is provided in thin sheet form. After cleaning the diamond or CBN and metal surfaces to be joined, the parts are clamped together with the thin sheet of alloy in between and then heated above the melting temperature of the silver-base alloy.

FIG. 2 shows a fragmentary cross section through the rim portion of a diamond or CBN grinding wheel. The entire wheel or only the rim 15 thereof is made of molybdenum. A plurality of relatively small diamond or CBN particles 16 are distributed over the surface of the rim portion of the wheel and bonded thereto with a silver-manganese-zirconium bonding layer 17 having a composition as previously given. A suitable process is to first coat the diamond or CBN particles 16 with the silver-base alloy, coat the surface of the rim portion 15 of the metal wheel, and then clamp the coated diamond or CBN particles to the coated rim while applying heat to form the bond. The advantages of the high tensile strength and high thermal conductivity bond between the abrading elements and the metal wheel or support member are evident.

FIG. 3 illustrates a cross section through the end portion of a metal cutting insert or tool holder 18 with an alloy diamond or CBN cutting element 19. As is evident, cutting tool elements of this type used for instance on a milling machine or lathe, generates considerable heat during metal removal operations and requires a strong bond to the tool holder. The strong, high thermal conductivity silver-base bonding layer 20 between the cutting tool 19 and metal support member 18 results in an improved product. FIG. 4 shows a diamond or CBN compact wire drawing die 21 with an alloy bond 22 as herein described to a molybdenum or tungsten support member 23. The strong bond and efficient heat removal likewise result in an improved product.

While the invention has been particularly shown and described with reference to several preferred embodiments thereof, it will be understood by those skilled in the art that various changes in form and details may be made therein without departing from the spirit and scope of the invention.

What we claims as new and desire to secure by Letters Patent of the United States is:

1. A grinding wheel comprising a plurality of particles selected from the group consisting of diamond and CBN, a rim portion having coefficient of thermal expansion substantially matching the coefficient of thermal expansion of said body and being made of a metal selected from the group consisting of molybdenum and tungsten, said particles being distributed over the surface of said rim portion and bonded thereto with a silver-base alloy bonding layer consisting essentially in atom percent of 0.1 to 15 percent manganese, 0.1 to 5 percent zirconium, and the balance silver, said alloy bonded chemically to said body.

2. A grinding wheel according to claim 1 wherein the rim portion is made of molybdenum and said silver-base alloy bonding layer consists essentially in atom percent of 3 percent manganese, 3 percent zirconium, and 94 percent silver.

* * * * *